(12) United States Patent
Nishida et al.

(10) Patent No.: US 7,031,086 B2
(45) Date of Patent: Apr. 18, 2006

(54) MAGNETIC RECORDING APPARATUS, MAGNETIC RECORDING MEDIUM AND MAGNETIC RECORDING METHOD

(75) Inventors: Yasutaka Nishida, Kodaira (JP); Takehiko Hamaguchi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 7 days.

(21) Appl. No.: 10/695,830

(22) Filed: Oct. 30, 2003

(65) Prior Publication Data
US 2004/0257690 A1 Dec. 23, 2004

(30) Foreign Application Priority Data
Jun. 23, 2003 (JP) ............... 2003-178715

(51) Int. Cl.
*G11B 5/09* (2006.01)
(52) U.S. Cl. ............... 360/48; 360/31; 360/46; 360/77.08; 360/51
(58) Field of Classification Search .......... 360/45, 360/48, 49, 51, 57, 60, 66, 77.08
See application file for complete search history.

(56) References Cited

U.S. PATENT DOCUMENTS

| | | | | |
|---|---|---|---|---|
| 4,160,236 A | * | 7/1979 | Oka et al. ............... | 714/774 |
| 5,467,330 A | * | 11/1995 | Ishida et al. ............ | 369/59.24 |
| 5,903,404 A | * | 5/1999 | Tsurumi et al. .......... | 360/48 |
| 5,986,592 A | * | 11/1999 | Nakagawa et al. ........ | 341/94 |
| 6,057,790 A | * | 5/2000 | Igata et al. .............. | 341/95 |
| 6,522,610 B1 | * | 2/2003 | Kuroda .................... | 369/53.2 |
| 6,583,943 B1 | * | 6/2003 | Malone, Sr. ............. | 360/48 |
| 6,657,813 B1 | * | 12/2003 | Nishida et al. ........... | 360/125 |
| 6,667,813 B1 | * | 12/2003 | Saruwatari et al. ....... | 358/1.15 |
| 6,728,051 B1 | * | 4/2004 | Igarashi et al. .......... | 360/51 |
| 6,775,099 B1 | * | 8/2004 | Kuroda et al. ........... | 360/126 |
| 6,788,481 B1 | * | 9/2004 | Fang et al. .............. | 360/31 |

OTHER PUBLICATIONS

William Cain, Alexander Payne, Michael Baldwinson and Robert Hempstead, "Challenges in the Practical Implementation of Perpendicular Magnetic Recording", IEEE Transactions on Magnetics, vol. 32, No. 1, Jan. 1996, pp. 97-102.

\* cited by examiner

*Primary Examiner*—David Hudspeth
*Assistant Examiner*—Dismery Mercedes
(74) *Attorney, Agent, or Firm*—Reed Smith LLP; Stanley P. Fisher, Esq.; Juan Carlos A. Marquez, Esq.

(57) ABSTRACT

The probability of occurrence of post-recording erasure phenomena in which recorded data is erased is reduced by adding at the end of a sector block a repetition pattern 56 of a minimum bit length for that sector block.

8 Claims, 9 Drawing Sheets

*Prior Art* FIG.14

Prior Art FIG.15
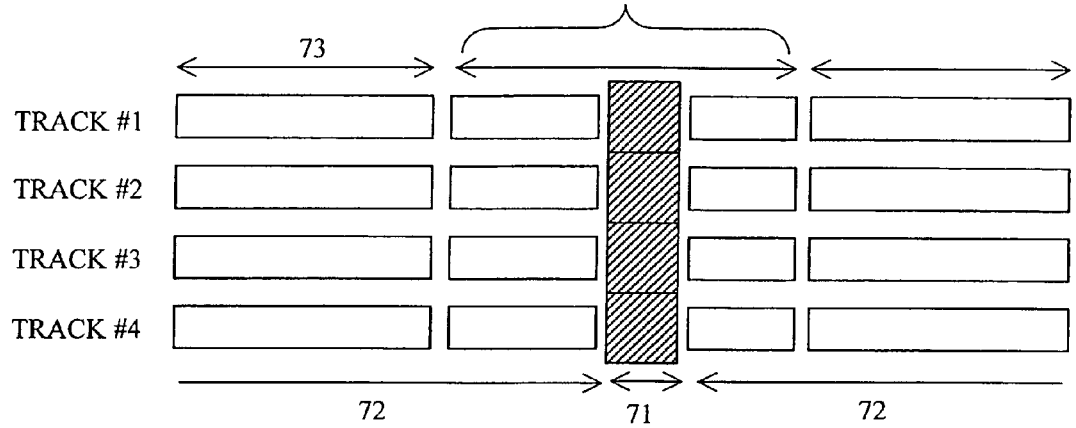
SPLIT SECTOR
Prior Art FIG.16
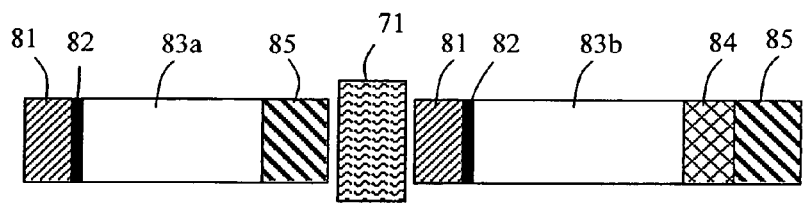
Prior Art FIG.17
CLOCK
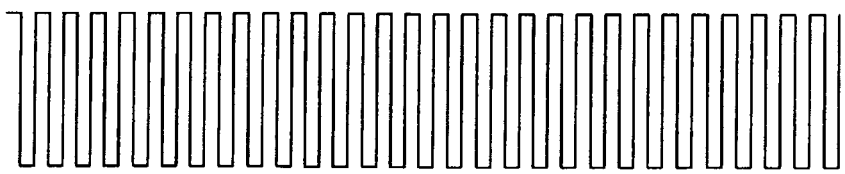
RECORDING PATTERN IN A SECTOR BLOCK
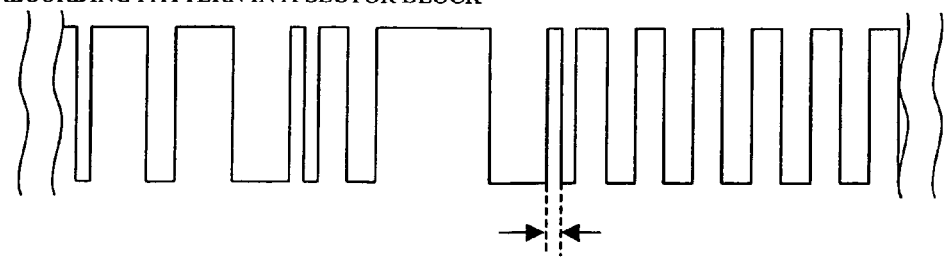
T : MINIMUM BIT LENGTH

MAGNETIC RECORDING APPARATUS, MAGNETIC RECORDING MEDIUM AND MAGNETIC RECORDING METHOD

BACKGROUND OF THE INVENTION

1. Technical Field

The present invention relates to a magnetic recording apparatus, magnetic recording medium, and magnetic recording method.

2. Background Art

For achieving ever-higher densities in magnetic disc apparatuses, it is considered advantageous to use a double-layer perpendicular magnetic recording system. This system employs a double-layer perpendicular magnetic recording medium having a soft magnetic underlayer, and a single pole type (SPT) head having a main pole and an auxiliary pole. However, magnetic disc apparatuses of the double-layer perpendicular magnetic recording system have a problem in that, when the track pitch and the track width of the SPT head are narrowed to achieve higher recording density, residual magnetization remains at the tip of the main pole of the SPT head even when the recording current is made zero.

FIGS. 13A and 13B schematically show how residual magnetization remains at the tip of the main pole of a SPT head. FIG. 13A is an example where a track width Tw is wide, and FIG. 13B shows an example with a narrow track width Tw. When the track width is wide, the magnetization at the tip of the main pole can take a magnetization state such that the magnetic flux is confined within the pole and that no magnetic field escapes to the outside, as indicated by arrows in FIG. 13A. However, when the track width is narrow, the pole tip has a small and long shape, as shown in FIG. 13B, so that the magnetization can be easily directed in a perpendicular direction, resulting in residual magnetization. Since the double-layer perpendicular magnetic recording system employs a soft magnetic underlayer disposed opposite the main pole, the magnetization at the tip of the main pole tends to be more readily directed in a perpendicular direction.

When there is residual magnetization at the tip of the main pole, the flux leaking therefrom tends to flow toward the soft magnetic underlayer, and the resultant magnetic field could erase the data (recording magnetization) recorded in the recording layer or reduce the recording magnetization (resulting in a reduction of reproduction output, which will be hereafter referred to as a "post-recording erasure phenomena"). To overcome this problem, research has been conducted in the prior art to devise an SPT head in which the tendency of residual magnetization to remain is reduced by incorporating certain features into the structure or material of the head.

On a magnetic disc, servo areas are radially disposed in which position information is recorded. Currently, about 50 to 100 servo areas per track are provided. Tracks are provided on the magnetic disc in a concentric manner, with each track divided into a servo area 71 and a data area 72 where user data is recorded. As shown in FIG. 14, the data area is divided into sector blocks 73, so that user data can be recorded on a sector by sector basis. As shown in an enlarged view at the bottom of FIG. 14, each of the sector blocks 73 includes a preamble portion 81 for the extraction of sampling phase, for example, a sync portion 82 indicating the start of user data, a user data portion 83, an ECC portion 84 for a user data error correction code, and a postamble portion 85 whose main purpose is to converge metric calculations in a maximum likelihood decoder for the decoding of data.

As the length of the sector is different from the interval of the servo areas, a sector could overlie on a servo area. If that happens, the sector is split to divide user data in the middle, as shown in FIG. 15. Then, as shown in FIG. 16, a postamble portion 85 is added at the end of a user-data first-half portion 83a and, after the end of the sector area, a preamble portion 81 and a sync portion 82 are newly provided. User data 83b for the latter half is then recorded, an ECC portion 84 is added at the end, and a postamble portion 85 is added, thus completing one sector.

The recording pattern in the sector blocks follows a clock cycle determined for each disc radial position, as shown in FIG. 17, the pattern consisting of a combination of patterns of bits that are integer multiples of a minimum bit length T. The postamble portion, which has the purpose of converging metric calculations in a maximum likelihood decoder, normally consists of a repetition of bits that are twice the minimum bit length, or an arbitrary pattern suitable for convergence. However, in the case of the repetition pattern of minimum bit length, the input to the maximum likelihood decoder becomes zero so that the metric calculations cannot be converged. Accordingly, the minimum-bit length repetition pattern is not conventionally used in the postamble.

(Non-Patent Document 1)
W. Cain, IEEE Trans. Magn., 32, 97 (1996)

SUMMARY OF THE INVENTION

A countermeasure against the aforementioned problem of post-recording erasure attempts to bring about a state in which the tendency of residual magnetization is reduced by way of the structure or material of the head. Although this can be expected to reduce the probability of occurrence of the post-recording erasure phenomena, there is no guarantee that the phenomena can be completely prevented. If residual magnetization remains in the head after the recording of a certain sector block and then the post-recording erasure phenomena occurs, the recording magnetization in the sector block that immediately follows is attenuated, thus lowering the signal quality. Alternatively, the recording magnetization in the immediately subsequent servo area decreases, resulting in a deteriorated positioning accuracy. In either case, there is the possibility of deterioration in error rate.

Thus, the post-recording erasure phenomena, once it occurs, could possibly cause some fatal problems such as the erasure of user data that has been recorded or the servo area, or deterioration of the signal quality. Accordingly, the probability of occurrence of the post-recording erasure phenomena must be reduced as much as possible. It is therefore the object of the present invention to provide a solution to this problem.

In order to achieve the aforementioned object of the invention, at the end of a block in which data is recorded, normally a sector block, a repetition pattern of a minimum bit length for the particular sector block is added without fail.

The invention provides a magnetic recording apparatus comprising a magnetic recording medium having a soft magnetic underlayer and a magnetic recording layer, a magnetic head including a recording head, a signal processing circuit for converting user data into a recording data sequence on a sector block by sector block basis, and a current driver for converting the recording data sequence into a recording current which is applied to the recording head. The signal processing circuit adds a repetition pattern of a minimum bit length for each block at the end of the recording data sequence for the particular sector block.

The signal processing circuit typically adds a repetition pattern of a minimum bit length after a postamble portion that follows an ECC portion. The length of the minimum bit length added is preferably four or more bits, further preferably 1 or more byte. The recording head is typically a single pole type head including a main pole and an auxiliary pole. When a minimum track pitch in the apparatus is 250 nm or less, a track width of the main pole of the recording head is naturally 250 nm or less. It is known that a post-recording erasure phenomenon starts to occur at the main pole track width of 250 nm or less, and therefore some countermeasures are needed.

The invention also provides a magnetic recording medium comprising a soft magnetic underlayer and a magnetic recording layer in which user data is recorded on a sector block by sector block basis. A repetition pattern of a minimum bit length for each sector block is added at the end of a recording data sequence in the particular sector block.

The invention further provides a method of recording information on a magnetic recording medium comprising a soft magnetic underlayer and a magnetic recording layer using a recording head. The method comprises the steps of converting inputted user data into a recording data sequence, adding a repetition pattern of a minimum bit length at the end of the recording data sequence, converting the recording data sequence to which the repetition pattern of the minimum bit length is added at the end thereof into a recording current, and driving the recording head with the recording current.

BRIEF DESCRIPTION OF THE DRAWINGS

FIG. 14 shows the recording format and the structure of the sector block in a conventional magnetic disc apparatus.

FIG. 15 shows how the sector is split in a conventional magnetic disc apparatus.

FIG. 16 shows the structure of the sector block when split in a conventional magnetic disc apparatus.

FIG. 17 schematically shows a recording pattern in a sector block in a conventional magnetic disc apparatus.

DESCRIPTION OF THE INVENTION

The present invention will be hereafter described by way of embodiments with reference made to the drawings.

Figure 1:
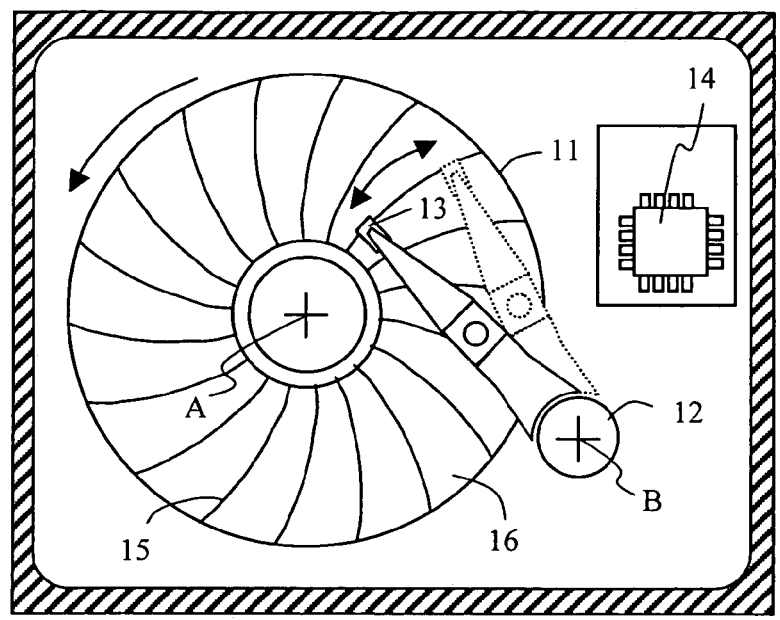
FIG. 1 shows an example of the structure of a magnetic disc apparatus.

FIG. 1 schematically shows a magnetic disc apparatus according to the double-layer perpendicular magnetic recording system. The magnetic disc apparatus includes a magnetic disc (magnetic recording medium) 11 that rotates about a spindle motor rotation axis A, a magnetic head 13 rotatable to the left and right about a pivot B of a rotary actuator 12, and an electric circuit system including a head amplifier 14 for supplying a recording current to the magnetic head 13 and amplifying a reproduction signal from the magnetic head 13.

Figure 2:
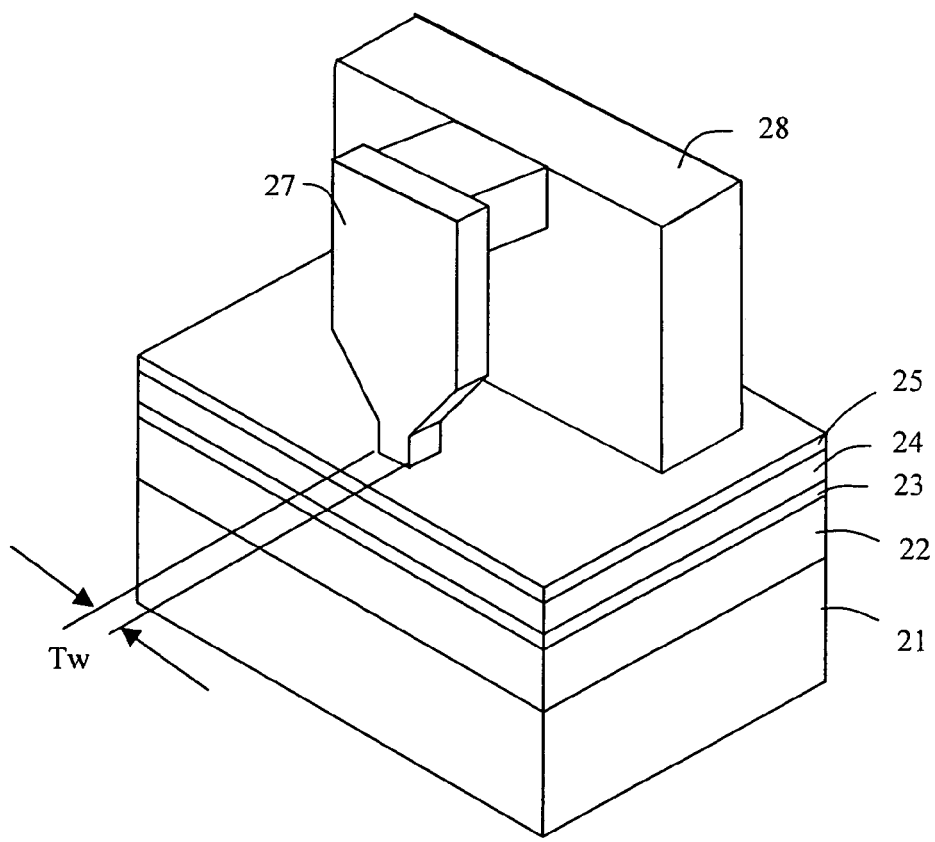
FIG. 2 shows an enlarged view of portions of a magnetic recording medium of a double-layer perpendicular magnetic recording system and an SPT head.

FIG. 2 is an enlarged view of portions of the magnetic recording medium of the double-layer perpendicular magnetic recording system and SPT magnetic head. The magnetic head includes a recording head and a reproducing head utilizing the magnetoresistance effect, which will not be described in detail herein. The magnetic recording medium includes a substrate 21, a soft magnetic underlayer 22, an intermediate layer 23 for controlling the crystallinity of the recording layer, a magnetic recording layer 24, and a protective film 25. The SPT head includes a main pole 27 for creating recording magnetization in the recording layer 24, and an auxiliary pole 28 to which the magnetic flux leaving the main pole returns via the soft magnetic underlayer 22 of the medium. A track width Tw of the main pole is 150 nm and the track pitch is 180 nm. While some SPT heads include a soft-magnetic shield surrounding the head, the term SPT head herein refers to those recording heads comprising at least a main pole and an auxiliary pole in which the magnetic field with which magnetization is eventually created in the recording medium is emitted by the main pole 27.

Figure 3:
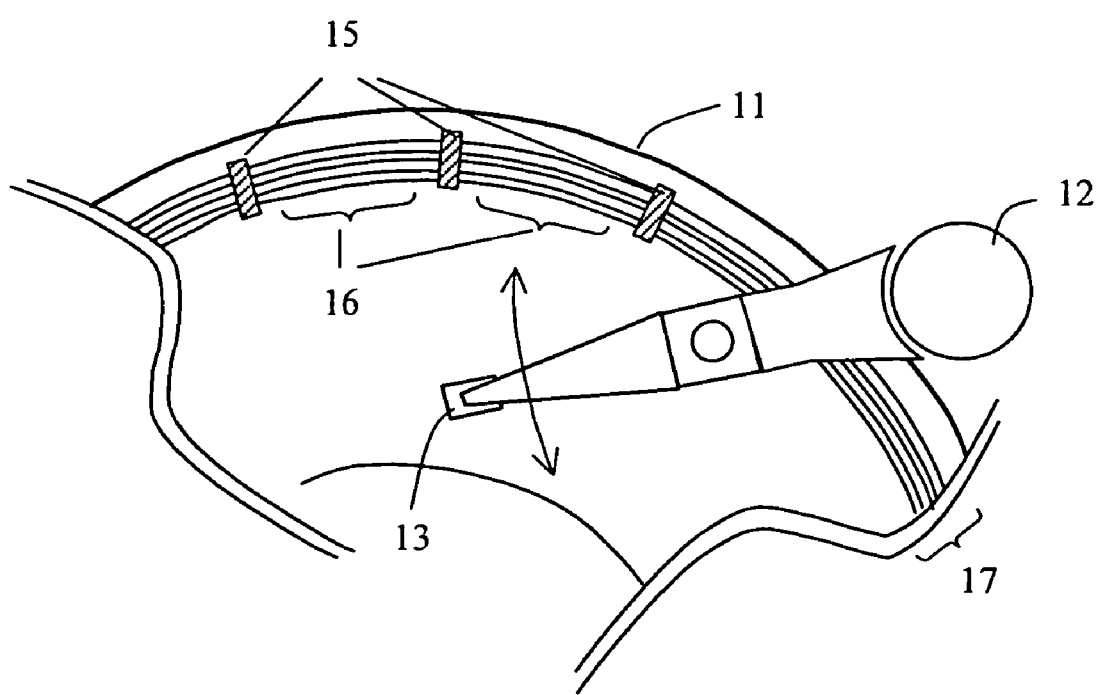
FIG. 3 schematically shows areas on the magnetic disc.

FIG. 3 schematically shows areas on the magnetic disc 11. On the magnetic disc 11 are radially disposed servo areas 15 in which position information is recorded. Tracks 17 are also disposed on the magnetic disc 11 concentrically or spirally. Each of the tracks 17 is divided into a servo area 15 and a data area 16. User data is recorded in the data area 16.

Figure 4:
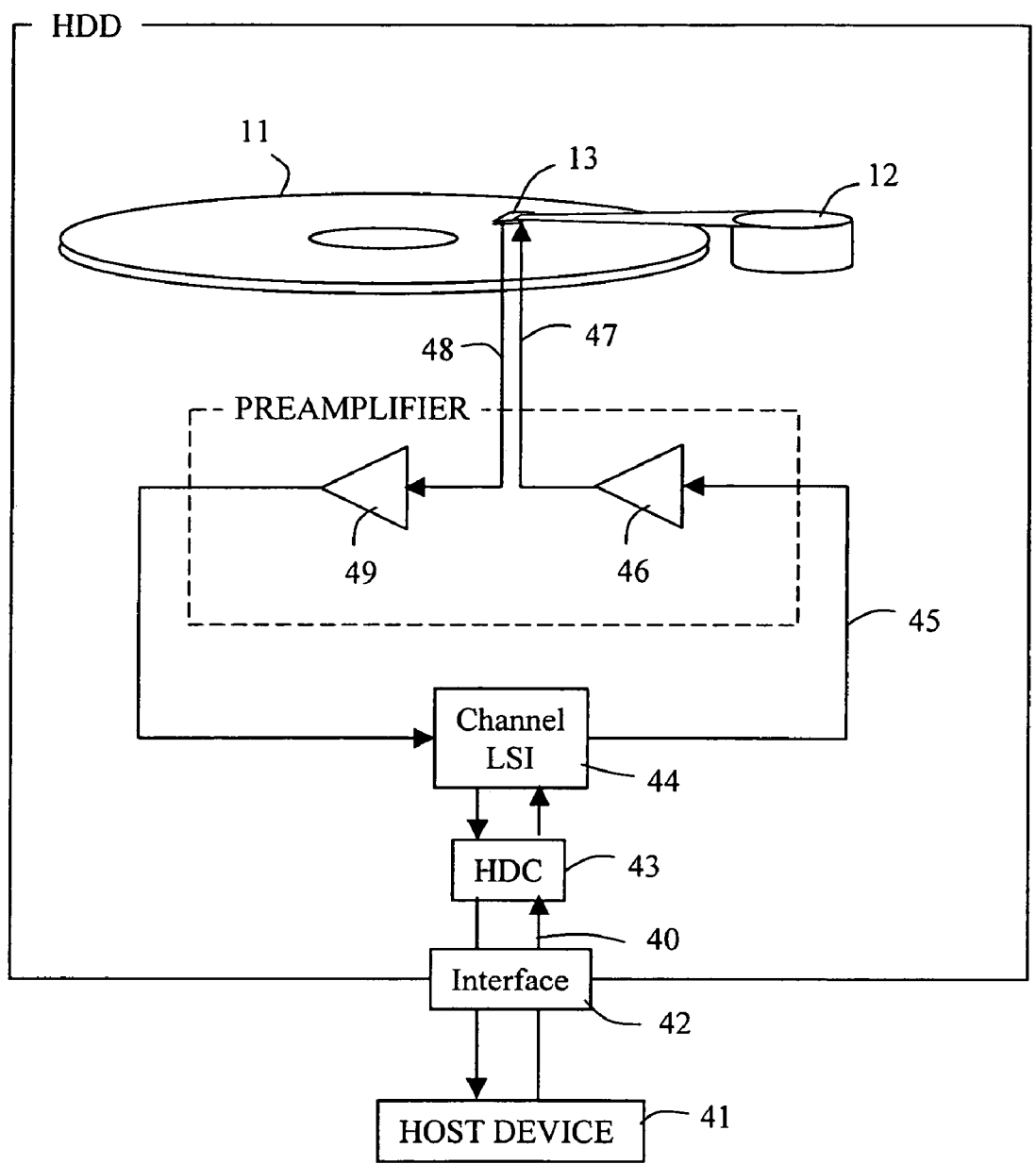
FIG. 4 schematically shows the flow of recording and reproduction signals in the magnetic disc apparatus according to the invention.

Now referring to FIG. 4, the flow of recording and reproduction signals in the magnetic disc apparatus according to the invention will be described. User data 40 sent from a host device 41 such as a PC is sent via an interface 42 to a HDC (hard disc controller) 43. In the HDC 43, an ECC (error correction code) or the like is attached to the user data, which is then delivered to a channel LSI 44. The channel LSI 44 converts the data into recording codes suitable for the magnetic recording and reproduction system, for example, and the codes are then delivered to a preamplifier as a recording data sequence 45. The recording data sequence 45 is converted by a recording current driver 46 in the preamplifier into a recording current 47. As the recording current 47 is applied to the SPT magnetic head 13, a recording magnetic field is applied from the main pole of the SPT magnetic head 13 to the magnetic disc 11, thus writing information into the magnetic disc 11. On the other hand, a reproduction output 48 obtained from the reproducing head in the magnetic head 13 is amplified in a reproduction amplifier 49 in the preamplifier. The recording codes are decoded in the channel LSI 44, and, if necessary, the ECC is decoded in the HDC 43. The output is then delivered via the interface 42 to the host device 41 as readout data.

Data is recorded on a sector block by sector block basis. Normally, in the data areas within a single concentric track in the magnetic disc apparatus, data that is recorded on the magnetic disc is represented by a combination of lengths that are integer multiples of the minimum bit length (in time units, minimum bit period: T). In order to correct for the non-linearity in the magnetic recording and reproduction system, the recording is conducted while slightly shifting the position of magnetization inversion (write precompensation). However, as a desired recording bit length is an integer multiple of T even when the bit lengths are varied by write precompensation, the recording bit lengths will be herein described as being integer multiples of T.

In the present embodiment, the area on the disc is divided into 12 zones in accordance with the disc radius position, with each zone assigned a minimum bit period T. Thus, even within the same zone, the bit lengths recorded on the disc differ from track to track depending on the disc radius position. When the zones are different, the minimum bit period T differs, so that different bit lengths are recorded.

Figure 5:
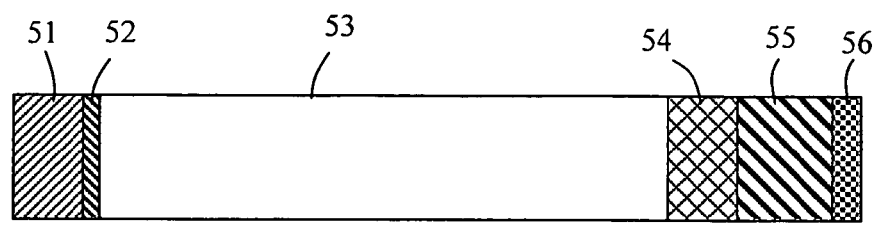
FIG. 5 shows an example of a sector block according to the invention.
Figure 6:
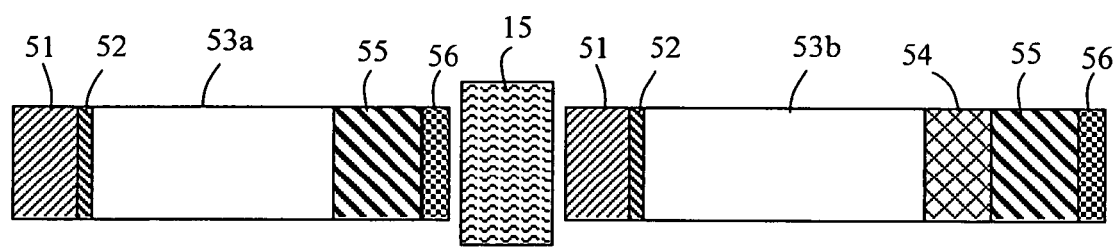
FIG. 6 shows an example of a sector block when split in accordance with the invention.

FIGS. 5 and 6 show examples of the sector block according to the invention. The sector block includes a preamble portion 51 where a pattern is recorded whose main purpose is to pull in the frequency or phase for sampling by ADC (analog-digital converter). The block also includes a sync portion 52 indicating the start of user data, a user data portion 53, an ECC (error correction code) portion 54, and a postamble portion 55 whose main purpose is to converge calculations in a maximum likelihood decoder in a signal processing LSI. An arbitrary pattern may be set in the postamble portion 55; an optimum pattern can be selected depending on the class of partial response and the response profile.

In the present embodiment, a minimum-bit length repetition pattern (1T pattern) 56 with an arbitrary number of bits is added at the end of a normal postamble in the channel LSI 44, as shown in FIG. 5. In case the sector overlies the servo area 15, the sector is split as shown in FIG. 6 and the user data is divided in the middle. At the end of a first half 53_a_ of user data is added the postamble portion 55 and a minimum-bit length repetition pattern (1T pattern) 56 with an arbitrary number of bits. Following the sector area, another preamble portion 51 and sync portion 52 are provided, and then a latter half 53_b_ of user data is recorded. At the end of the latter half of user data are then provided an ECC portion 54, a postamble portion 55, and a minimum-bit length repetition pattern (1T pattern) 56 with an arbitrary number of bits, thereby completing one sector.

Figure 7:
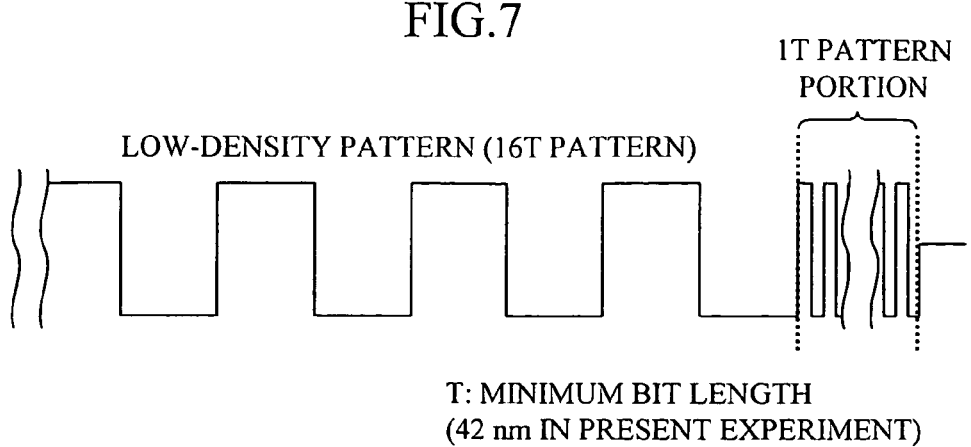
FIG. 7 schematically shows a recording pattern used in an evaluation experiment.

In order to determine the number of bits for adding a 1T pattern, an evaluation experiment was conducted. In the user data portion, a low-density pattern was used in which post-recording erasure tends to occur. FIG. 7 schematically shows the recording pattern used in the evaluation experiment. In this experiment, the low-density pattern employed a bit length that is 16 times the minimum bit length in the relevant track. Evaluation was conducted in a configuration where the 1T pattern was added immediately after the low-density pattern while removing the ECC portion. Evaluation was conducted by repeating recording and reproduction (output measurement). Post-recording erasure was defined as the probability of reduction of the reproduction output by 10% or more.

Figure 8:
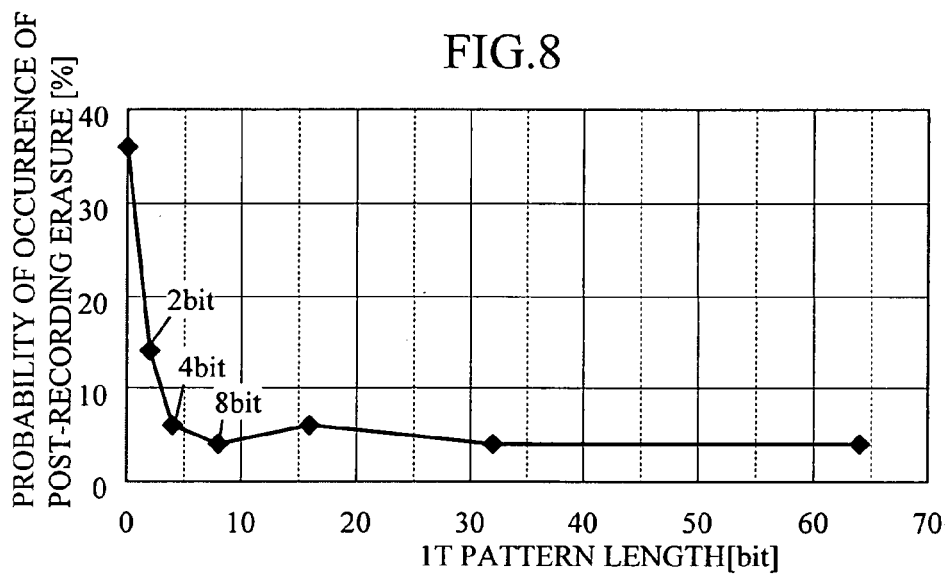
FIG. 8 shows the relationship between the probability of occurrence of post-recording erasure and the length of 1T pattern added.

FIG. 8 shows the relationship between the probability of occurrence of post-recording erasure (output drop of 10% or more) and the length of 1T pattern added. As shown in FIG. 8, it was confirmed that the addition of 1T pattern resulted in a sharp decrease in the probability of occurrence of post-recording erasure, and that the occurrence probability can be reduced down to about 5% when the 1T pattern length is four bits or more. Specifically, the occurrence probability was reduced in half with even two bits, and the reduction effect hardly changed with the addition of four bits or more.

Figure 9:
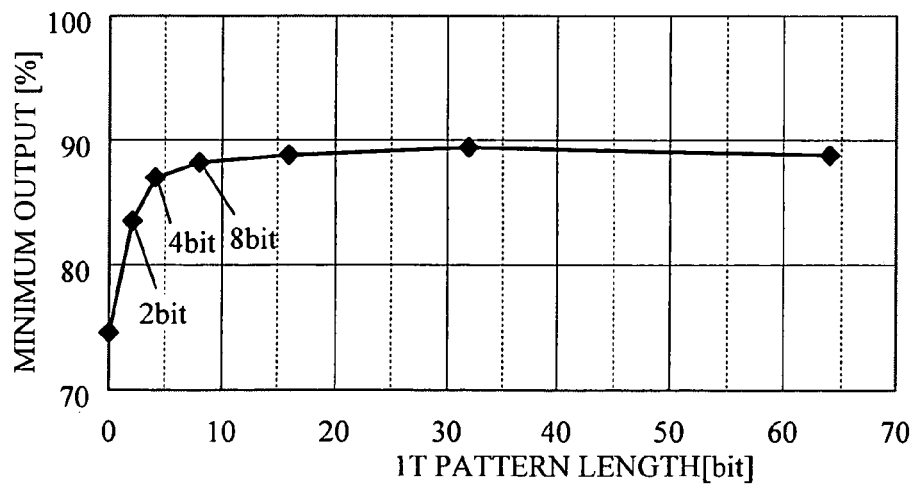
FIG. 9 shows the relationship between the output minimum value and the length of 1T pattern added.

FIG. 9 shows the relationship between the output minimum value and the 1T pattern length obtained in the aforementioned experiment. By the addition of 1T pattern, the minimum output increases. The minimum-output increasing effect is exhibited even when the length of 1T pattern added is two bits. The effect begins to saturate at four bits, and it stabilizes at about 90% of the maximum output with 10 bits or more. Fluctuations of this magnitude do not produce any fatal error.

Figure 10:
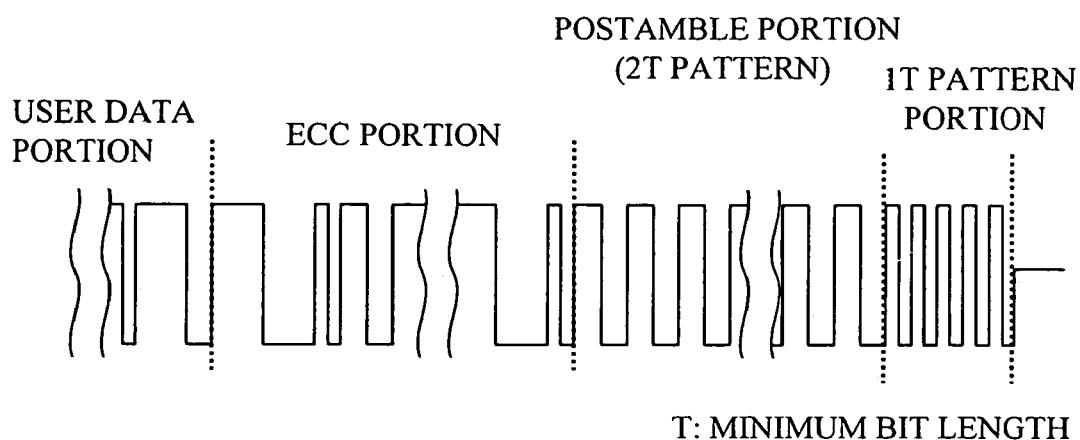
FIG. 10 shows an example of a recording current pattern in a terminal portion of the sector block according to the invention.

In view of the above results, it was decided that in the present embodiment 1T pattern of 16 bits (2 bytes), which is longer than the 10 bits in the experimental results, should be added, in light of variations due to individual differences. FIG. 10 shows an example of a sector-end portion of the recording current pattern in the present embodiment. While conventionally the pattern ends with a postamble pattern, a 1T pattern of 2 bytes is added in the embodiment. In case a sector is divided by a servo area and thus split, a 1T pattern is added at the end of the postamble of each of the first and latter halves of the split sector.

While in the evaluation experiment in the present embodiment, about 5% of post-recording erasure probability and about 10% of output fluctuation remained, these include factors such as the fluctuation of the reproducing head. These fluctuations can be in reality further reduced by using the reproducing head in combination with a recording head to which an anti-post recording erasure measure has been provided.

Figure 11:
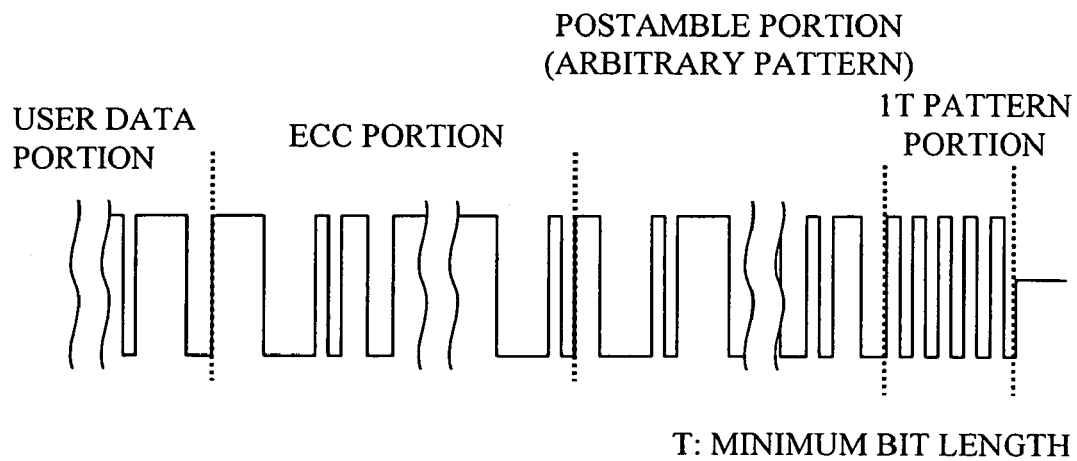
FIG. 11 shows another example of the recording current pattern in an end portion of the sector block according to the invention.
Figure 12:
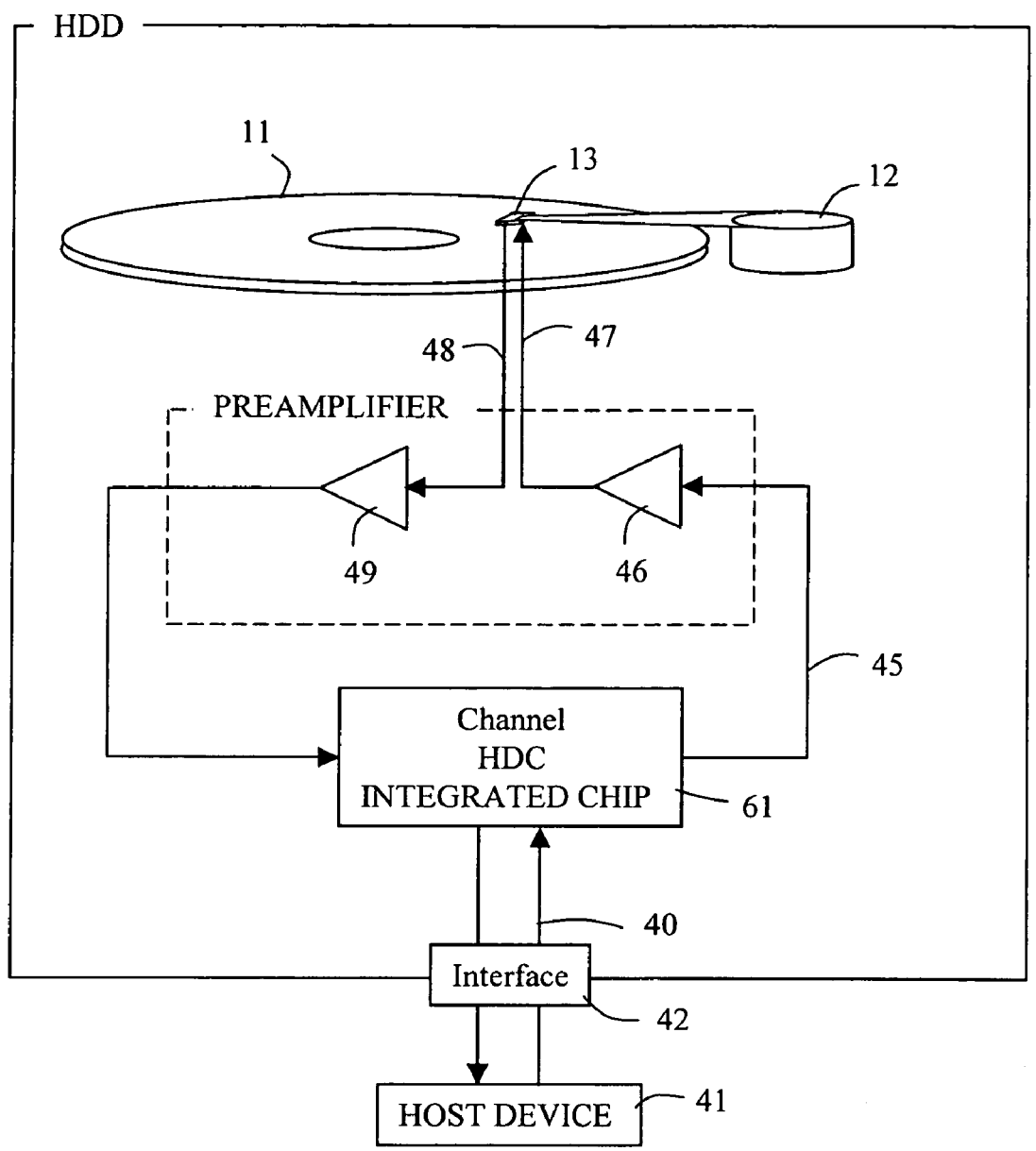
FIG. 12 shows the flow of the recording and reproduction signals in the case where an integrated chip is used.
Figure 13:
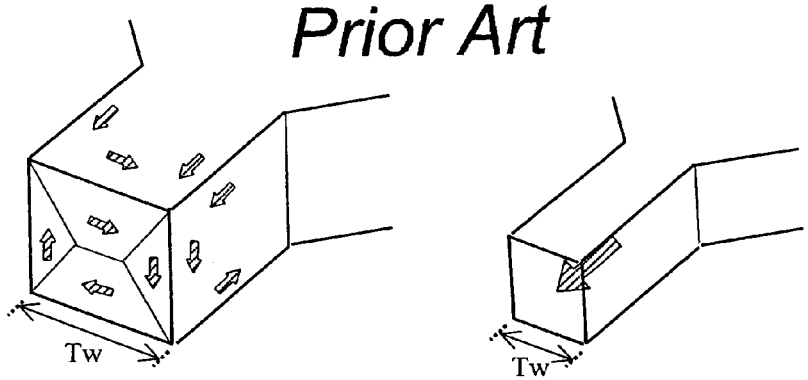
FIG. 13 schematically shows a state of residual magnetization at the tip of a main pole.
Figure 13:
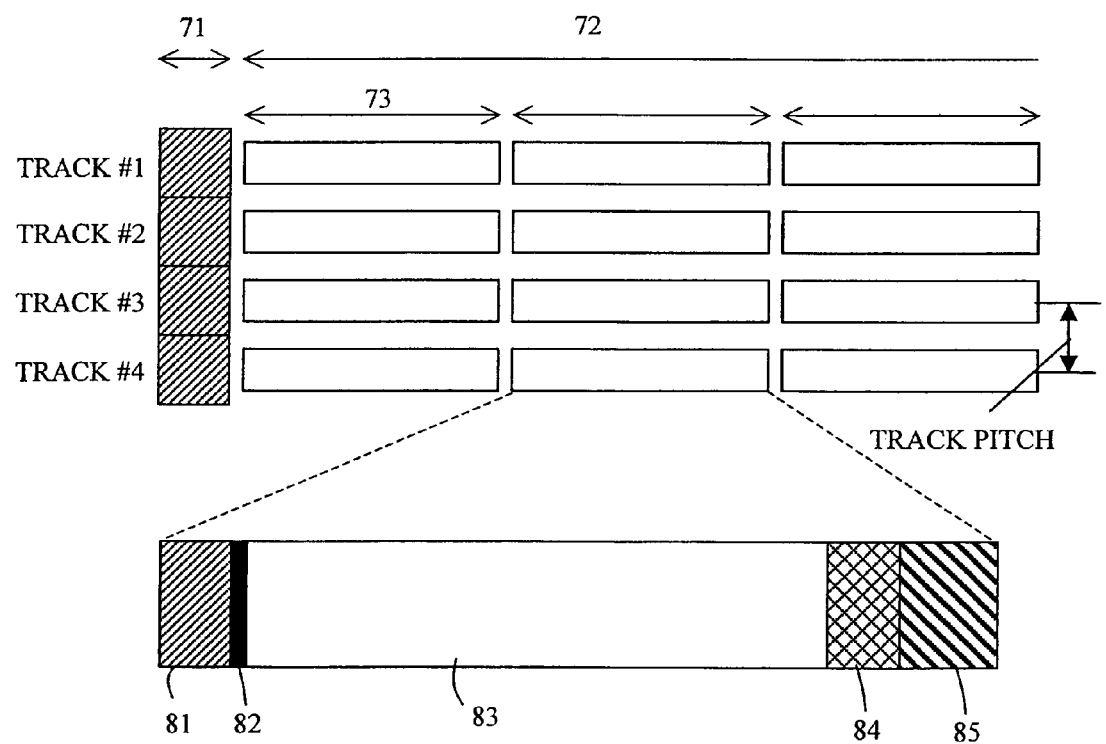

While in the embodiment shown in FIG. 10 a 2T pattern is used in the postamble portion, it is possible to use a pattern other than a 2T pattern, as shown in FIG. 11. Further, while in the above description an SPT head with only a main pole and an auxiliary pole was used as the recording head, a shield-type SPT head may be used in which a shield is provided around the main pole. The present invention can also be applied to a ring-shaped head used for longitudinal recording, where there is the possibility of similar post-recording erasure phenomena. In the circuit example shown in FIG. 4, the channel LSI 44 and the HDC 43 are constructed as separate components; however, a channel LSI/HDC integrated chip 61 combining both functions can also be used, as shown in FIG. 12.

While the invention has been described with reference to an example of a perpendicular recording medium having a perpendicular magnetic anisotropy, the invention can also be applied to magnetic disc apparatuses using diagonal recording media having an axis of easy magnetization in a diagonal direction on the medium film surface. While the above embodiment employs a head transport mechanism based on a rotary actuator, the present invention can also be applied to magnetic disc apparatuses employing a head transport mechanism based on a linear actuator. Further, the invention is not limited to magnetic disc apparatuses employing disc-shaped recoding media. For example, the effects of the invention can be obtained in digital recording apparatuses employing tape recording media in which data is recorded on a block by block basis, by adding a 1T pattern at the end of data write unit.

Thus, in accordance with the invention, the probability of occurrence of post-recording erasure phenomena in a double-layer perpendicular recording medium can be reduced, which phenomena occurs due to residual magnetization in the main pole of the recording head. Accordingly, the invention can provide a magnetic recording and reproduction apparatus that is highly reliable and inexpensive.

What is claimed is:

1. A magnetic recording apparatus comprising:
    a perpendicular magnetic recording medium having a soft magnetic underlayer and a magnetic recording layer;
    a magnetic head including a recording head;
    a signal processing circuit for converting user data into a recording data sequence on a sector block by sector block basis; and
    a current driver for converting the recording data sequence into a recording current that is applied to the recording head, wherein
    the signal processing circuit adds at the end of the recording data sequence for each sector block a repetition pattern of a minimum bit length for the particular block, and the repetition pattern comprises four or more bits of repetitions of magnetization inversion at the intervals of a minimum-bit length of a relevant sector.

2. The magnetic recording apparatus according to claim 1, wherein the signal processing circuit adds a repetition pattern of the minimum bit length after a postamble portion that follows an ECC portion.

3. The magnetic recording apparatus according to claim 1, wherein the length of the minimum bit length added is one byte or more.

4. The magnetic recording apparatus according to claim 1, wherein the recording head is a single pole type head having a main pole and an auxiliary pole.

5. The magnetic recording apparatus according to claim 1, wherein a minimum track pitch in the apparatus is 250 nm or less.

6. A perpendicular magnetic recording medium comprising a soft magnetic underlayer and a magnetic recording layer in which user data is recorded on a sector block by sector block basis, wherein, at the end of a recording data sequence in each sector block, a repetition pattern of a minimum bit length for the particular sector block is added, and the repetition pattern comprises four or more bits of repetitions of magnetization inversion at the intervals of a minimum-bit length of a relevant sector.

7. The perpendicular magnetic recording medium according to claim 6, wherein the repetition pattern of the minimum bit length is added after a postamble portion that follows an ECC portion in each sector block.

8. A method of recording information on a perpendicular magnetic recording medium comprising a soft magnetic underlayer and a magnetic recording layer using a recording head, the method comprising the steps of:
    converting inputted user data into a recording data sequence;
    adding a repetition pattern of a minimum bit length at the end of the recording data sequence, the repetition pattern comprising four or more bits of repetitions of magnetization inversion at the intervals of a minimum-bit length of a relevant sector;
    converting the recording data sequence to which the repetition pattern of the minimum bit length is added at the end thereof into a recording current; and
    driving the recording head with the recording current.

* * * * *